(12) United States Patent
Weinfurther et al.

(10) Patent No.: US 7,400,724 B2
(45) Date of Patent: Jul. 15, 2008

(54) DEVICE AND METHOD FOR USE IN QUANTUM CRYTOGRAPHY

(75) Inventors: Harald Weinfurther, Munich (DE); Christian Kurtsiefer, Munich (DE)

(73) Assignee: Ludwig-Maximilians-Universitat Muchen (DE)

( * ) Notice: Subject to any disclaimer, the term of this patent is extended or adjusted under 35 U.S.C. 154(b) by 648 days.

(21) Appl. No.: 10/473,771

(22) PCT Filed: Apr. 5, 2002

(86) PCT No.: PCT/EP02/03825

§ 371 (c)(1),
(2), (4) Date: Apr. 9, 2004

(87) PCT Pub. No.: WO02/082714

PCT Pub. Date: Oct. 17, 2002

(65) Prior Publication Data

US 2004/0156502 A1    Aug. 12, 2004

(30) Foreign Application Priority Data

Apr. 6, 2001    (DE)    ................    101 17 272

(51) Int. Cl.
*H04K 1/06* (2006.01)
*H04K 1/00* (2006.01)
*H04M 3/16* (2006.01)
*H04L 9/00* (2006.01)
*G02B 26/02* (2006.01)
*G02B 5/22* (2006.01)

(52) U.S. Cl. .................. 380/44; 380/256; 380/277; 380/278; 380/41

(58) Field of Classification Search .................. 380/44, 380/256, 277, 278, 41
See application file for complete search history.

(56) References Cited

U.S. PATENT DOCUMENTS

| 5,243,649 A | 9/1993 | Franson |
| 5,307,410 A | 4/1994 | Bennett |
| 5,732,139 A | 3/1998 | Lo et al. |
| 5,757,912 A | 5/1998 | Blow |

(Continued)

FOREIGN PATENT DOCUMENTS

EP    0 717 895 B1    11/1998

OTHER PUBLICATIONS

Physical Review Letters; vol. 84, No. 24; Dated Jun. 12, 2000—Daylight Quantum Key Distribution Over 1.6 km; W. T. Buttler, R. T. Hughes, S. K. Lamoreaux, G. L. Morgan, J. E. Nordholt and C.G. Peterson—University of California, Los Alamos National Laboratory, Los Alamos, New Mexico 87545; Received Jan. 14, 2000.

(Continued)

*Primary Examiner*—Ayaz Sheikh
*Assistant Examiner*—Shin-Hon Chen
(74) *Attorney, Agent, or Firm*—Welsh & Katz, Ltd.

(57) ABSTRACT

The present invention relates to a quantum cryptography system for the secure key generation, especially with signal sources and analysis channels. The signal sources are arranged spatially separated in such a manner that the wave fronts of light signals emitted by them superimpose partially at the input of the quantum channel. The analysis channels are arranged in such a manner that the wave front of the light signals coming from the quantum channel are split up spatially and at least two of the parts are analyzed in a quantum mechanical state.

15 Claims, 2 Drawing Sheets

Empfänger für Quantenkryptographie

U.S. PATENT DOCUMENTS

| | | | |
|---|---|---|---|
| 5,999,285 A | 12/1999 | Brandt et al. | |
| 6,188,768 B1 | 2/2001 | Bethune et al. | |
| 6,289,104 B1 * | 9/2001 | Patterson et al. | 380/283 |
| 6,430,345 B1 * | 8/2002 | Dultz et al. | 385/122 |
| 6,529,601 B1 * | 3/2003 | Townsend | 380/256 |
| 6,748,081 B1 * | 6/2004 | Dultz et al. | 380/277 |

OTHER PUBLICATIONS

Physical Review A; vol. 63, 012309; Dated Dec. 13, 2000; Long-distance entanglement-based quantum key distribution; Gregoire Ribordy, Jugen Brendel, Jean-Daniel Gautier, Nicolas Gisin and Hugo Zbinden; Gap-Optique, Universite de Geneve, 20 rue de l'Ecole-de-Medecine, 1211 Geneve 4, Switzerland; Received Aug. 7, 2000.

Applied Physics B Lasers and Optics; Towards practical quantum cryptography; Dated Nov. 10, 1999; S. Chiangga, P. Zada, T. Jennewein and H. Weingurter; Received Jul. 27, 1999/Revised version Sep. 3, 1999.

* cited by examiner

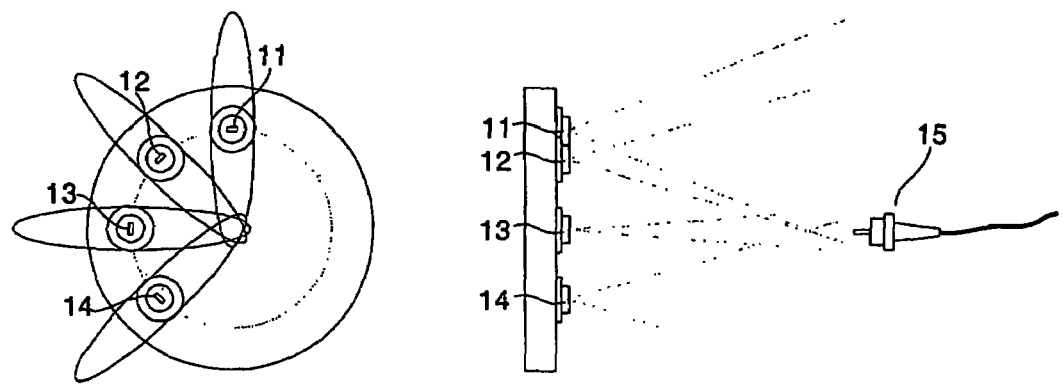
Fig. 1: Sender für Quantenkryptographie mit Kopplung in Glasfaser
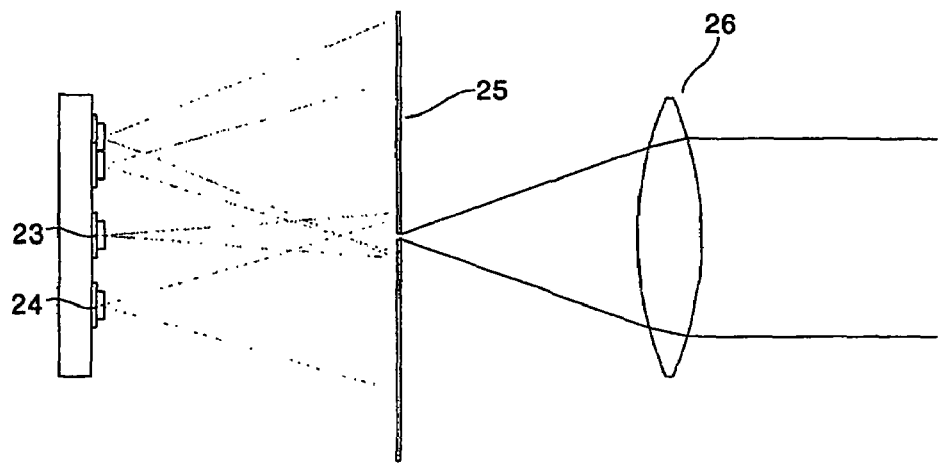
Fig. 2: Sender für Quantenkryptographie mit Kopplung in optische Richtstrecke

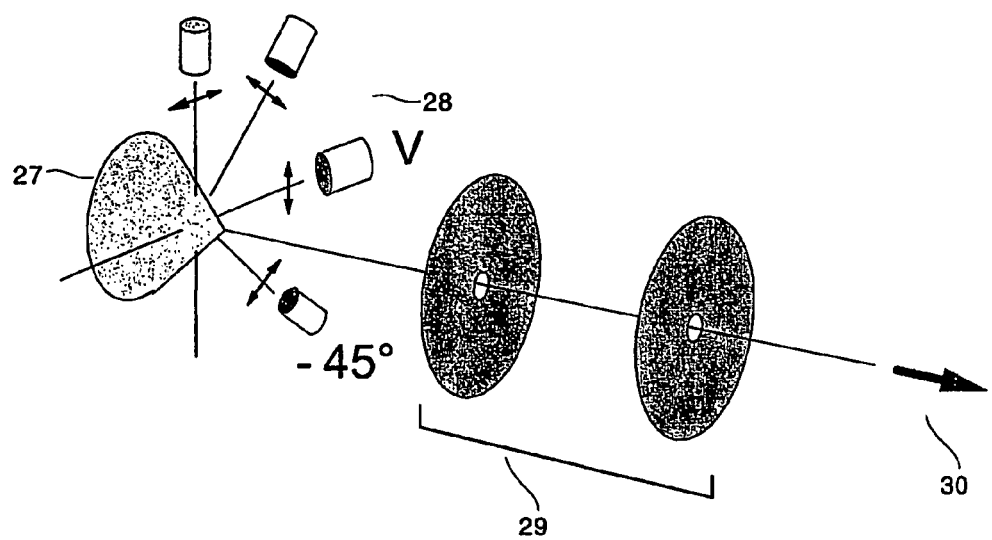
Fig. 2a: Sender für Quantenkryptographie mit verkürzter Baulänge
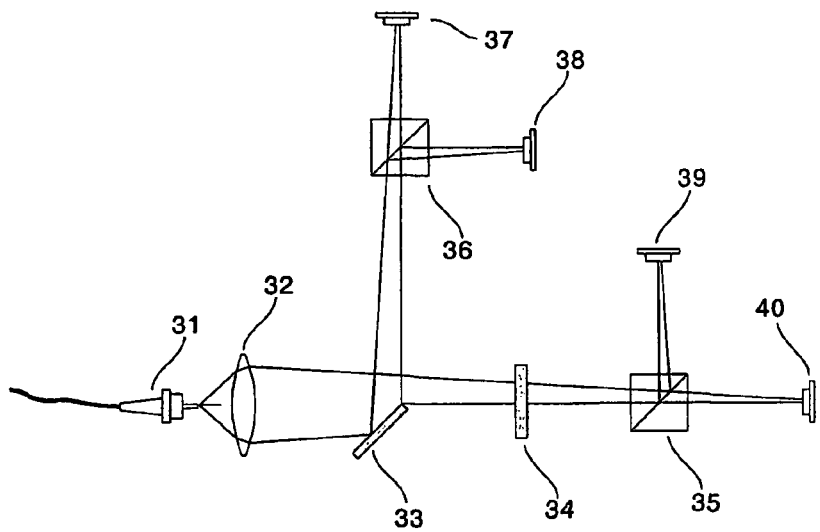
Fig. 3: Empfänger für Quantenkryptographie
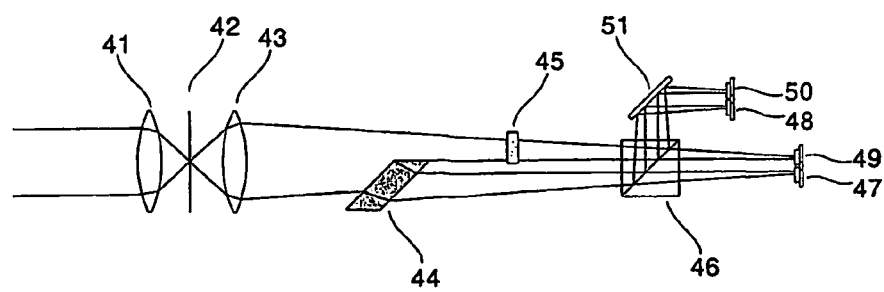
Fig. 4: Empfänger für Quantenkryptographie

DEVICE AND METHOD FOR USE IN QUANTUM CRYTOGRAPHY

BACKGROUND OF THE INVENTION

Quantum cryptography facilitates a quantifiable secure communication. By the transmission of quantum particles, particularly photons, an arbitrary, secure key can be generated. This key can then be used for the enciphering of corresponding methods (e.g., one-time-pad, DES). Possible eavesdropping attempts change the quantum particles in a way that errors in the generated key show the attack. This is in considerable contrast to the conventional system in which the security of the transmission is based, e.g., on the faith in couriers or on (unproved) assumptions of the technological abilities of the eavesdropping person.

Quantum cryptography was theoretically suggested for the first time in 1984 and experimentally realized in 1991. Several theoretical and experimental publications and patents led to a rapid development in this field. At present, the research in the field of quantum cryptography concentrates over all on the technical implementation of first prototypes. Here great attention is paid to the miniaturization of the systems used as well as on a high stability and economic efficiency of the transmitter and receiver optics.

The prior art relevant for the present invention is documented, e.g., by:
[1] U.S. Pat. No. 5,307,410 Interferometric quantum cryptographic key distribution system CH. H. Bennett
[2] U.S. Pat. No. 5,732,139 Quantum cryptographic system with reduced data loss H-K. Lo, H. F. Chau
[3] EP 0 776 558 Quantum cryptography P. D. Townsend
[4] U.S. Pat. No. 5,243,649 Apparatus and method for quantum mechanical encryption for the transmission of secure communication J. D. Franson
[5] EP 0 923 828 Quantum cryptography device and method N. Gisin, A. Mueller, B. Perny, H. Zbinden, B. Huttner
[6] EP 0 717 895 B1 Key distribution in a multiple access network using quantum cryptography P. D. Townsend, D. W. Smith
[7] U.S. Pat. No. 5,757,912 System and method for quantum cryptography K. J. Blow
[8] EP 0 722 640 B1 Cryptographic receiver J. G. Rarity, P. R. Tapster
[9] Towards practical quantum cryptography S. Chiangga, P. Zarda, T. Jennewein, H. Weinfurther Appl. Phys. B. 69, 389 (1999)
[10] Daylight quantum key distribution over 1.6 km W. T. Buttler, R. J. Hughes, S. K. Lamoreaux, G. L. Morgan, J. E. Nordholt, C. G. Peterson Phys. Rev. lett. 84, 5652 (2000)
[11] Long distance entanglement based quantum key distribution G. Ribordy, J. Brendel, J.-D. Gautier, N. Gisin, H. Zbinden Phys. Rev. A 63, 012309 (2001)

A summarizing documentation can also be found in the article "Quantenkryptographie" by U. Gebranzig, W. Süß-muth, Jahrbuch des deutschen Patentamts 1999.

The present invention relates to a system for the secure distribution of cryptographic keys according to the method of the quantum cryptography. In the quantum cryptography, as known from U.S. Pat. No. 5,307,410 [1] and U.S. Pat. No. 5,732,139 [2], a cryptographic key is generated by transmitting information carrying light signals between two or more participants on the quantum channel, by measuring said signals and by exchanging information on the measured values via a conventional communication channel. Possible eavesdropping attacks during the transmission of the light signals can be detected according to conclusions of the quantum theory. The generated cryptographic key is of great importance for the transmission of all kinds of information due to its high security.

From [3]-[5], apparatuses are known, which are suitable for the key distribution in accordance with the principles of quantum cryptography. In particular, transmitter and receiver are described, which provide rapid switches for changing quantum mechanical states of the light signals transmitted by a signal source and detected by an analysis channel. Here, disadvantages are the high costs and the high technical efforts being necessary for the rapid operation of the switches.

According to the patents [6] and [7], the efforts can be reduced. A first simplification is described in EP 0 717 895 B1 [6]. Here apparatuses for quantum cryptography are described, in which non-orthogonal quantum states are coupled by an optical switch into the output of the transmission unit. U.S. Pat. No. 5,757,912 [7] describes a method in which 2 sources generate orthogonal light states. Thus, a reduction in the efforts by the factor 2 for the phase modulation is achieved.

From documents [8]-[11], apparatuses are known in which no switches are necessary due to the use of 2 or more signal sources or 2 or more analysis channels. Here, the light signals emitted by the signal sources are superimposed in the transmitter device by means of optical components, especially semipermeable mirrors, or the light signals are split in the receiver device by means of a semipermeable mirror. Here, the signal sources are controlled in such a way that only one of the sources generates at a time one single photon or a reduced light impulse at the output of the transmitter device. According to patent EP 0 722 640 B1 [8], in the receiver the incoming photon is distributed at random on the different analyzers by a beam splitter and is registered by one of the detectors, thus forming the signal relevant for the key generation.

During the technical realization, it has proven especially disadvantageous that therefor the direction of the signal sources has to be accurately adjusted and that necessary components, particularly the semipermeable mirrors, change the quantum mechanical state in an undesired manner. For its correction, further optical components have to be introduced and to be adjusted accurately. The high number of optical components and the high adjusting efforts cause an increased space requirement, a non-optimal signal/noise ration and a bad stability of the systems. It has also proven disadvantageous that especially for the use of new, more efficient methods (U.S. Pat. No. 5,732,139 [2]), a variation of the splitting ration can only be achieved by exchanging and adjusting optical components anew.

The present invention is based on the object to provide an improved apparatus and an improved method for the quantum cryptography.

This object is solved with the subject-matter of the claims.

SUMMARY OF THE INVENTION

It is an advantage of the present invention that existing apparatuses can be simplified with regard to the number and kind of the optical components and thus to facilitate a further miniaturization, an increase of the flexibility as well as an improvement of the signal/noise ratio under consideration of the stability and the economical efficiency.

According to the present invention, the signal sources are spatially arranged in such a manner that the wave fronts of the light signals emitted by said sources partially superimpose each other at the input of the quantum channel and/or the analysis channels are spatially arranged in such a manner that the wave fronts of the light signals coming from the quantum channel are spatially split up and at least 2 of the parts are analyzed in a quantum mechanical state.

In an advantageous embodiment of the present invention, mirrors and other components changing the wave fronts are used. Thus the size of the transmitting and receiving optics can be reduced considerably, without disturbing the quantum mechanical states of the light signals. As components changing the wave fronts, mirrors, prisms, glass plates, lenses and/or diffractive elements can be used.

By deferring the geometrical arrangement of a mirror or the analysis channels within the light cone of the receiver unit, the splitting ratio onto the different analysis channels can be adjusted and be optimized for the special case.

The arbitrary splitting at random onto several analysis channels is guaranteed by the light cone being spatially split up. In accordance with the quantum mechanic, the detection of a single photon light signal is arbitrary and not determined in the different parts of the light cone.

It is a special advantage of the present invention that the spatial superimposing or splitting of the light cone can be used flexibly for several kinds of quantum mechanical states. In particular, in an embodiment according to the present invention, the quantum mechanical state can be realized by the property of polarization of the light signals, or alternatively, by a phase difference of components having an offset in time of the light signal or by a phase difference of frequency components of the light signal.

In an advantageous version of the present invention, the analysis channels are formed in such a manner that the optical components can be commonly used for several channels without loosing the complete functionality. This reduces the complexity, the costs and the size of the receiver optic.

The present invention is formed by the geometrical superimposition of the light beams generated by the signal sources at the output as well as the geometrical splitting of the light beam in the receiver. The casualty necessary for the quantum cryptography in the receiver is guaranteed, contrary to the known systems, not by the casualty of the detection in the output of the beam splitter but by the casualty of the detection in geometrically different parts of the light beam.

The following features of the present invention are advantageous or preferred:

The present invention comprises a cryptographic transmitter with at least 2 signal sources, the transmitter in which at least 2 of the prevailing signal sources are non-orthogonal in the sense of a quantum mechanical preparation and which is characterized in that the light coming from the signal sources spatially superimposes at the output of the transmitter and enters the quantum channel.

The spatial superimposition can be achieved either solely by the divergence of the beam of the signal sources or by means of mirrors, lenses, prisms or refractive elements.

The present invention further comprises a cryptographic receiver unit with at least 2 measuring units for quantum mechanical properties, wherein at least 2 of the measuring units are oriented non-orthogonally in the sense of a quantum mechanical measuring, the receiver unit being characterized in that the light beam coming from the quantum channel is split up geometrically between the measuring units.

This is achieved either by the geometrical arrangement of the measuring unit within the light beam or by the introduction of mirrors, lenses, prisms or refractive elements in the light beam.

The splitting ratio onto the different measuring units can be varied by changing the position of the measuring unit or of the introduced components (mirror, lens, prism, glass plate, refractive element).

According to the quantum mechanic, it is undetermined and arbitrary in which part of the light beam, i.e., in which of the measuring units, a single photon coming from the quantum channel is detected.

A quantum cryptography system can use either a transmitter described above or a receiver mentioned above or both units.

The transmitter can further be equipped with additional signal sources, which have such properties that they emit light into the output that can be used for adjusting, synchronization or information transmission within the quantum cryptographic system.

The signal sources are light sources characterized in that the light emitted by them and coupled into the quantum channel either (a) has a well defined polarization orientation or (b) has a relative phase position at different instants in time or (c) has a relative phase position for different frequencies. This is achieved by polarizers and/or phase elements which are introduced into the light beam.

Light which has been coupled from different signal sources into the quantum channel does not distinguish there in its transversal beam profile.

Measuring units register the light, wherein (a) the polarization of the light has a determined orientation, (b) the light coming in at different instants in time has a determined relative phase position, (c) the incoming light having different frequencies has a determined relative phase position.

The receiver can be equipped with further measuring units for the purpose of synchronization, adjusting, security checks and information transmission within the quantum cryptography system.

The Figures show advantageous embodiments of the present invention. The features of the present invention which are believed to be novel are set forth with particularity in the appended claims. The invention, together with further objects and advantages thereof, may best be understood by reference to the following description in conjunction with the accompanying drawings.

FIG. 1 shows the preferred embodiment of a transmitter;

FIG. 2 shows a further preferred embodiment of a transmitter;

FIG. 2a shows a version of the embodiment shown in FIG. 2 with reduced overall length;

FIG. 3 shows a preferred embodiment of a receiver; and

FIG. 4 shows a further preferred embodiment of a receiver.

DETAILED DESCRIPTION

Embodiment

Transmitter:

For simplifying existing quantum cryptography systems, the light of a plurality of signal sources is superimposed (FIG. 1). According to known quantum cryptography systems, an external source (random generator, computer) determines by number which of a plurality of signal sources (11-14) emits a short light impulse. The signal sources used in the present embodiment are laser diodes which emit light with a well defined linear polarization (polarization degree >97%). The laser diodes are oriented in a way that the polarization of the light emitted by them each has a distortion of 45° with regard to that emitted by the preceding diode. This means, depending on the number given by the external source, a light impulse having a polarization direction of either 0° (vertical polarization direction) (11), 45° (12), 90° (horizontal) (13) or 135° (14) is emitted. The laser diodes are arranged in a semi-circle in such manner that similar parts of the emitted light superimpose at the output due to the beam divergence (see the indicated light cone in the front view). For reducing the overall length or for adapting the beam divergence, a concave lens (convex mirror) can be introduced in the beam path. The light is coupled into a monomode fiber (15) (quantum channel).

In an alternative embodiment (FIG. 2), the light emitted by laser diodes (21-24) having different orientations is coupled (optionally via a lens or a mirror) into a blind (25) serving for space filtering. The light exiting here can be prepared via further lenses (26) (and optionally blinds, telescope arrangement) as quantum channel for an optical directional link.

In both embodiments, if desired, additional laser diodes, the emitted light of which can be used for synchronization and adjusting, can be arranged in the center of the 4 laser diodes.

For reducing the overall length in a preferred embodiment, a conically shaped mirror element (27) is used (FIG. 2*a*). This is arranged in the center of a circular arrangement of the laser diodes (28) in such a manner that the divergence of the light beams can be adapted advantageously to the divergence of the space filter (29) and the quantum channel (30).

Receiver:

In the receiver shown in FIG. 3, light comes via the monomode fiber (quantum channel) (31) from the transmitter and is collimated by a lens (32) or focused onto the detectors. Into the thus broadened light beam, a mirror (33) is partially introduced, which then reflects a corresponding part of the light to an analysis unit. The other part of the light passes a wave plate (34) and then reaches a further analysis unit. The wave plate is oriented in such a manner that linear polarized light having an orientation of 45° (−45°) is transformed into vertically (horizontally) polarized light. Both analysis units comprise a polarizing beam splitter (35, 36) and 2 single photon detectors (37-40). The polarizing beam splitter reflects vertically polarized light and transmits horizontally polarized light. The signal of the single photon detectors mark the detected polarization: 0° (37), 45° (39), 90° (38), 135° (40). The signal is prepared by a suitable electronic circuitry for a signal processing according to known quantum cryptography protocols.

In an alternative embodiment (FIG. 4), the light passes a space filter with lenses (41), blinds (42). The light exiting the last blind is focused onto the detectors by a lens (43). A plane parallel glass plate (44) is introduced into the right part of the light beam. It is tilted in such a manner that the passing light is horizontally deferred to the right. Into the left partial beam, a wave plate (45) is introduced. It is oriented in such a manner that linear polarized light having an orientation of 45°(−45°) is transformed into vertically (horizontally) polarized light. Both partial beams enter into a polarizing beam splitter (46) which transmits horizontally polarized light and reflects vertically polarized light. In this arrangement, both measuring channels use the same polarizing beam splitter. The transmitted or reflected light is registered by 4 single photon detectors (47-50). These detectors are arranged in pairs in such a manner that in the transmitted beam and in the reflected beam behind a mirror (51) that each left detector detects light which has passed the wave plate before and each right detector detects light which has passed the plane parallel plate before. Here too, the signal of the single photon detectors mark the detected polarization and is prepared by a suitable electronic circuitry for a signal processing according to known quantum cryptography protocols.

The novelty of this invention is the use of the wave front superimposition (in the transmitter) or the use of the wave front splitting (in the receiver). In contrast to conventional realizations which base on the principle of the superimposition or splitting by a beam splitter (amplitude superimposition or -splitting), the structure can be simplified and components can be avoided which cause disturbing side effects. Thus, an improvement of the signal/noise behavior and of the stability as well as a reduction of adjusting and maintenance requirements can be achieved. A miniaturization of the structure is facilitated considerably. Due to the adjustable partition in the receiver other protocols of the quantum cryptography [2] can be used selectively without the replacement of existing components.

Fields of Application and Development

Quantum cryptography is the only method for key distribution which guarantees a quantifiable security. Such a security is not available if conventional software methods are used and although additional apparatuses are required, there is a clear advantage over the key transmission by couriers.

Due to the development of multi-functional information technologies, the number and the value of transmitted information increases rapidly, so that a secure communication has an increasing importance for our society. This method is of economic interest for security-critical applications especially in the field of finance for banks and insurances.

Specific embodiments of an apparatus and method for quantum cryptography according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A quantum cryptography system for a secure key generation comprising:
   one or more transmitters with an electronic transmitter circuit and a transmitter optic;
   one or more receivers with an electronic receiver circuit and a receiver optic;
   a quantum channel, which connects the transmitter(s) with the receiver(s) and serves for the transmission of light signals;
   at least 2 signal sources in the transmitter optic, which emit light signals in distinguishable, also non-orthogonal, quantum mechanical states;
   an electronic transmitter circuit, which allows only one of the signal sources to emit at one instant in time; and
   at least 2 analysis channels in the receiver optic, which can analyze distinguishable quantum mechanical conditions and forward distinguishable signals which identify the conditions to the electronic receiver circuit;
   where
   the signal sources are spatially arranged in such a manner that the wave fronts of the light signals emitted by them superimpose each other at least partially at the input of the quantum channel; and/or the analysis channels are spatially arranged in such a manner that the wave fronts of the light signals coming from the quantum channel are spatially split up and the quantum mechanical state of at least two of the parts can be analyzed.

2. The quantum cryptography system according to claim 1 where wave front changing optical components cause the superimposing and/or the splitting of the wave fronts.

3. The quantum cryptography system according to claim 1 where laser diodes are used as signal sources.

4. The quantum cryptography system according to claim 1 where sources of single photons are used as signal sources.

5. The quantum cryptography system according to claim 1 where a quantum mechanical state is given by the polarization of the light signals.

6. The quantum cryptography system according to claim 1 where spatially oriented signal sources and/or polarizers adjust the polarization of the light signals in the transmitter optic.

7. The quantum cryptography system according to claim 1 where polarization rotators change the polarization of the light signals.

8. The quantum cryptography system according to claim 1 where spatially oriented polarizers and/or detectors in the receiver optic analyze the polarization of the light signals.

9. The quantum cryptography system according to claim 1 where the analysis channel comprises a single photon detector and/or a polarization rotator and/or an oriented polarizer, where different analysis channels can commonly use any polarization rotators and/or polarizers present.

10. The quantum cryptography system according to claim 1 where a quantum mechanical state is given by the phase difference between two or more components having an offset in time of the light signal.

11. The quantum cryptography system according to claim 1 where a non-adjusted interferometer in the transmitter optic generates the components having an offset in time of the light signals and a non-adjusted interferometer in the receiver optic processes the incoming light signals.

12. The quantum cryptography system according to claim 11, where the non-adjusted interferometer comprises a polarizing beam splitter, and where a polarization caused by the signal sources, polarizers and/or polarization rotators results in a phase difference of the compounds having an offset in time of a light signal.

13. The quantum cryptography system according to claim 1 where signal sources in the transmitter optic and the detectors around the receiver optic are arranged spatially so that an activated signal source/an activated detector corresponds to a determined emitted/analyzed quantum mechanical condition.

14. The quantum cryptography system according to claim 1 where a quantum mechanical state is given by the phase difference between 2 or more frequency components of a light signal.

15. A method for the secure key generation by means of quantum cryptography comprising:
   providing one or more transmitters with an electronic transmitter circuit and a transmitter optic;
   providing one or more receivers with an electronic receiver circuit and a receiver optic;
   providing a quantum channel, which connects the transmitter(s) with the receiver(s) and serves for the transmission of light signals;
   emitting light signals in distinguishable quantum mechanical states by at least two signal sources in the transmitter optic;
   causing the electronic transmitter circuit to emit only one signal source at one instant in time;
   analyzing the distinguishable quantum mechanical conditions by at least two analysis channels in the receiver optic and forwarding the distinguishable signals identifying the conditions to the electronic receiver circuit;
   where
   the signal sources are arranged in such a manner that the wave fronts of the light signals emitted by them superimpose at least partially at the input of the quantum channel, and/or
   the analysis channels are arranged in such away that the wave front of the light signals coming from the quantum channel are spatially split up and the quantum mechanical state of at least two of the parts can be analyzed in a quantum mechanical condition.

* * * * *